United States Patent [19]
Fujime

[11] Patent Number: 5,925,089
[45] Date of Patent: Jul. 20, 1999

[54] MODEL-BASED CONTROL METHOD AND APPARATUS USING INVERSE MODEL

[75] Inventor: Yoko Fujime, Iwata, Japan

[73] Assignee: Yamaha Hatsudoki Kabushiki Kaisha, Shizuoka-ken, Japan

[21] Appl. No.: 08/893,440

[22] Filed: Jul. 10, 1997

[30] Foreign Application Priority Data

Jul. 10, 1996 [JP] Japan .................................. 8-180467

[51] Int. Cl.$^6$ .......................... G05B 17/00; F02D 41/00
[52] U.S. Cl. ........................................................ 701/106
[58] Field of Search ................................ 701/106, 104, 701/103; 123/489, 436, 682, 680, 681, 339.11, 339.12, 480; 364/431.05

[56] References Cited

U.S. PATENT DOCUMENTS

| | | |
|---|---|---|
| 4,492,195 | 1/1985 | Takahashi et al. ...................... 123/680 |
| 4,497,302 | 2/1985 | Sasayama et al. ...................... 123/681 |
| 4,862,851 | 9/1989 | Washino et al. ................... 123/339.11 |
| 4,901,240 | 2/1990 | Schmidt et al. ......................... 701/106 |
| 5,024,199 | 6/1991 | Abe ......................................... 123/489 |
| 5,200,898 | 4/1993 | Yuhara et al. ..................... 364/431.05 |
| 5,307,276 | 4/1994 | Takahashi et al. ..................... 701/106 |
| 5,394,331 | 2/1995 | Dudek et al. ........................... 701/106 |
| 5,524,599 | 6/1996 | Kong et al. ............................. 123/682 |
| 5,690,072 | 11/1997 | Meyer et al. ........................... 123/436 |
| 5,774,822 | 6/1998 | Maki et al. ............................. 701/104 |

*Primary Examiner*—Tony M. Argenbright
*Assistant Examiner*—Hieu T. Vo
*Attorney, Agent, or Firm*—Knobbe, Martens, Olson & Bear, LLP

[57] ABSTRACT

A model-based control system for controlling a state of an operating subject such as an engine, characterized by forming an inverse model using a forward model and a feedback control system. The subject is modeled using first-order lag elements and dead time, and dead time is removed from the feedback control system. Responsiveness is high not only during a stable state but also during a transient state.

12 Claims, 10 Drawing Sheets

$\dot{M}a$: Air In Intake Pipe
$\dot{M}at$: Air Flowing Into Intake Pipe
$\dot{M}ap$: Air Expelling Through Intake Valve

MODEL-BASED CONTROL METHOD AND APPARATUS USING INVERSE MODEL

BACKGROUND OF THE INVENTION

This invention relates to a control system using a model of a subject to be controlled, and particularly to a model-based control method and apparatus using an inverse model, suitable for controlling the air-fuel ratio of an engine.

Heretofore, a control system using a map has been employed for controlling the air-fuel ratio of an electrically controlled engine, for example. The map is made by collecting data related to a fuel-injection quantity at a certain engine speed and throttle angle, and storing the data in a memory. In actual use, an appropriate air-fuel ratio is determined by detecting an engine speed and a throttle angle, inputting the detected data into the map, determining a fuel-injection quantity based on the map, calculating a compensation most suitable for the operational conditions at the moment or determining the compensation using another map, and inputting the compensation as an actuating value into a drive apparatus system.

However, although an appropriate air-fuel ratio can be obtained by using the control system using a map if operational conditions are normal (i.e., a stable state), it is impossible to conduct appropriate air-fuel ratio control if operational conditions are transient (i.e., a transient state), wherein a throttle angle is changed due to acceleration or deceleration. In the above, after a throttle angle is changed, the change is detected, thereby controlling the air-fuel ratio, and thus, a controlled variable cannot appropriately be determined in accordance with the air or fuel flow. Thus, the control system using a map does not work when the operational state is transient.

SUMMARY OF THE INVENTION

An objective of the present invention is to provide a control system based on model-based control which has superior characteristics during a transient state, even when a subject (machine) to be controlled involves dead time or higher-order lag elements. According to the invention, a subject to be controlled (machine) is modelled, and by using the model (computer simulation model) as a forward model, an inverse model can easily be formed, irrespective of dead time or higher-order lag elements.

One important aspect of the present invention attaining the objective is a method for controlling machine, comprising: performing feedback control between an indicative signal (indicating a result of operation of the machine) and a causative signal (operating the machine) wherein the target-factor value is input and the operational value is output; forming a forward model (a computer simulation model) determines and outputs an indicative signal when a causative signal is inputted; connecting the forward model to the feedback control to form an inverse model, wherein the output of the feedback is inputted into the forward model, and the output of the forward model is inputted into the feedback control; and controlling the machine by inputting a predetermined target value of the indicative signal into the inverse model and outputting a modified value of the causative signal from the inverse model. By forming the inverse model using the forward model and the feedback control, the system can be simplified, and controllability is improved. In particular, responsiveness is high not only during a stable state of operation of the machine but also during a transient state.

In the above, when the machine is modeled using a system having a phase-lag of less than 180° and dead time, modeling can easily be conducted.

Further, in the above, the forward model preferably comprises a feedback-connected forward model whose input is the output of the feedback control, and a feedback-unconnected forward model whose input is a causative signal other than the output of the feedback. According to the above embodiment, modeling can easily be conducted, and the gain of the feedback can be increased so as to simplify processing at the inverse model. Further, the gain can be adjusted depending on the characteristics of the machine.

The above system is preferably adapted to an engine which has a first-order lag and dead time can easily be modeled. Accordingly, reliable control over the air-fuel ratio can be achieved, and engine output can be maximized.

BRIEF DESCRIPTION OF THE DRAWINGS

FIGS. 20A and 20B show graphs indicating fluctuations of controlled parameters.

DETAILED DESCRIPTION OF THE PREFERRED EMBODIMENT

The present invention can suitably be adapted to exert control on an engine installed in vehicles or vessels. However, no restriction is imposed on the type of machine to be controlled, and as with the engine, a robot used in machine tools, a motor used in electrically-driven vehicles, or the like can be controlled by adopting the model-based control system based on the same principle as in the engine.

In a preferred embodiment, a system constituting feedback of a subject to be controlled (machine) is modeled using a system having a phase lag of less than 180°, as well as dead time. In the above, "a system having a phase lag of less than 180°" is a system constituted by a first-order lag or a combination of first-order lags. Dead time includes zero. In particular, as an example of a system having zero dead time, an EFI, which will be explained later as a first embodiment, can be indicated. As an example of a system having a given dead time, a carburetor, which will be explained later as a second embodiment, can be indicated.

In another preferred embodiment, a system constituting feedback in a subject to be controlled is modeled using a system having a phase lag of less than 180°, as well as dead time. The dead time is removed from the model to form a forward model in the feedback system. In other systems, the phase of the dead time is advanced to form a forward model. In the above, the reason that the dead time is removed is to increase the gain of the feedback so as to form an inverse model, and thus, the dead time need not be removed from systems other than the feedback.

In a further preferred embodiment, as a method of advancing the above phase, a method of least squares or a neural network applied to information inputted to a subject is adapted.

In still another preferred embodiment, the aforesaid inverse model is used in combination with feedback control that compensates for an indicative signal by the inverse model.

In yet another preferred embodiment, in addition to the feedback control for compensating for an indicative signal by the inverse model, a learning control based on a neural network is used.

In a further preferred embodiment, a phase lag of the dead time is added to a reference (target value) in the above feedback control for compensation.

In the foregoing, preferably, the subject to be controlled is an engine, wherein means for detecting a driving state (operational state) includes means for detecting the engine speed and/or the throttle angle, and the air-fuel ratio of the engine is controlled.

Preliminary Experiments

As described earlier, a map control system is not appropriate during a transient state. In order to compensate for an indicative signal of a map control system during a transient state, a feedback control may be additionally used. However, in the feedback control, the gain cannot be so increased that air-fuel ratio control can appropriately be conducted during a transient state, i.e., compensation is insufficient.

A model-based control system can improve controllability, wherein a subject to be controlled is modeled and by using the model, control is conducted in such a way that output from the model coincides with output from the subject. As an embodiment of the model-based control system, conceived is a model which improves controllability during a transient state by feedforward control using a model, and which improves controllability during a stable state by feedback control. If an inverse function, $1/F(s)$ wherein $F(s)$ is a transfer function of the subject to be controlled, is used as a model, a transfer function of an entire system except for the feedback control system is as follows:

$$(1/F(s))*F(s)=1$$

Thus, an indicative signal can be constantly equal to a reference (target value). However, it is difficult in practice to realize a perfect inverse model, and further, if the model is non-linear, it is practically impossible to directly determine an inverse model.

Further, for example, in performing feedback control over a subject, such as an engine, having higher-order lag elements or dead time, when the gain of feedback elements is made large so as to form a perfect inverse function of the subject, it is possible to realize an inverse function, which outputs a causative signal necessary for the subject, by inputting a reference (target value). However, in practice, due to effects of dead time or higher-order lag elements, the gain of the feedback cannot be increased, and thus, the feedback elements cannot form a perfect inverse function. Accordingly, it is impossible to improve characteristics during a transient state. In the above system, if the gain of the feedback is increased, output oscillates and becomes unstable, and appropriate control becomes unfeasible.

In the present invention, a subject to be controlled is modeled, and by using the model as a forward model, an inverse model can easily be formed, even if the subject to be controlled involves dead time or higher-order lag elements, whereby the system based on model-based control has superior characteristics during a transient state.

Principle of Control System

In the present invention, an actual subject to be controlled is modeled, and by using the model instead of an actual system, a feedback system is constituted, thereby realizing an inverse function (inverse model). As described above, the reason that an inverse function cannot be constituted by a feedback system resides in dead time or higher-order lag elements. In the present model, these elements are removed to form an inverse function. As described in detail later, a subject is modeled by using first-order lag elements and dead time, and the dead time is then removed from the model, followed by advancing the phases in the system. In the above, the phases of elements involving no dead time are advanced using a method of least squares or a neural network.

By modeling the subject as above, a stable feedback system can be formed, thereby allowing for an increase in the gain of the feedback system, i.e., an inverse function (inverse model) can easily be realized, thereby conducting control having superior transient characteristics.

Figure 1:
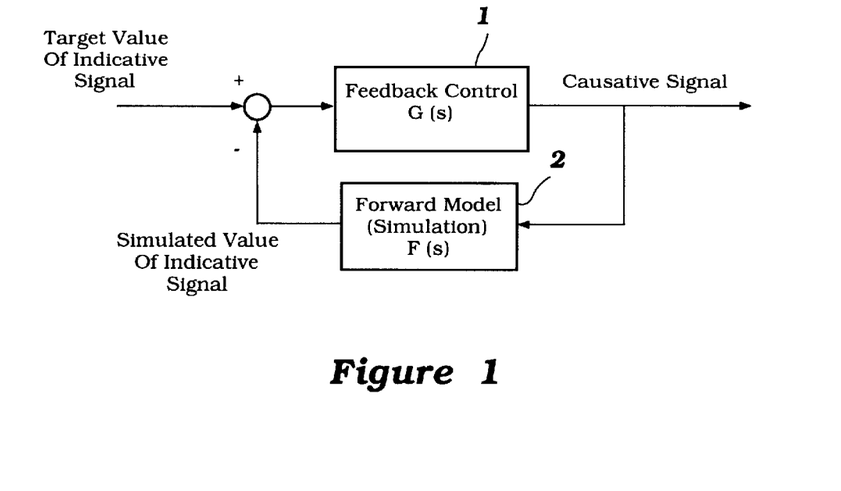
FIG. 1 shows a diagram explaining the principle of the present invention.

FIG. 1 shows a diagram explaining the principle of the present invention. Numeral 1 is a function $G(s)$ representing feedback, and numeral 2 is a transfer function $F(s)$ representing a forward model (computer simulation model) of a subject. In the present invention, the subject is modeled, thereby forming the transfer function $F(s)$ of the forward model, and then sending $F(s)$ back to a system upstream of the function $G(s)$ to form the inverse model in combination with the function $G(s)$.

In FIG. 1, if G(s)*F(s)>>1, the transfer function is as follows:

$$G(s)/(1+G(s)*F(s))=G(s)/(G(s)*F(s))=1/F(s)$$

An inverse model can thus be obtained. Accordingly, good controllability during a transient state can be achieved.

The model-based control system of the present invention will be explained further with reference to an embodiment. In the embodiment, a subject to be controlled is an engine installed in vehicles or vessels, and a state to be detected is a driving state.

Overview of Controlling System

Figure 2:
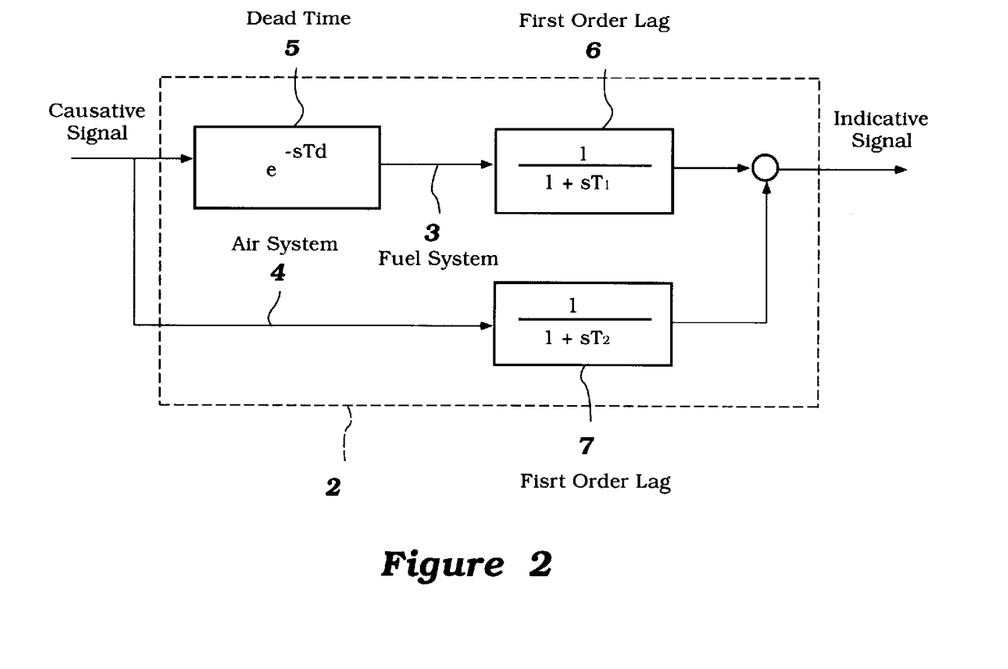
FIG. 2 shows an example wherein an engine having a first-order lag and dead time is modeled, according to the present invention.

FIG. 2 shows an example wherein an engine having a first-order lag and dead time is modeled. A forward model 2 of the engine is constituted by a fuel system 3 having a dead time 5 and a first-order lag 6, and an air system 4 having a first-order lag 4.

Figure 3:
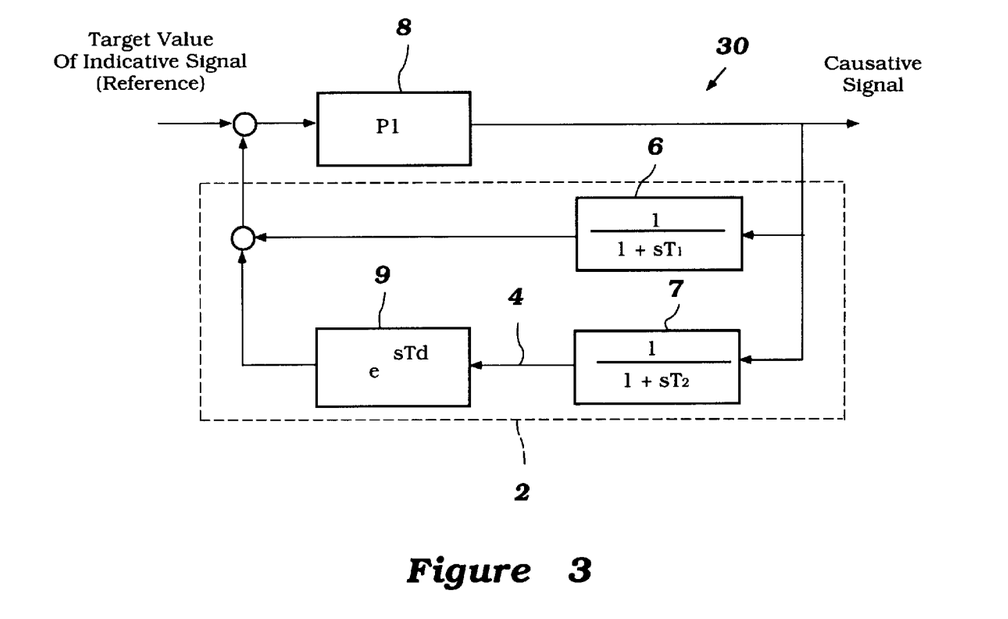
FIG. 3 shows an inverse model using the forward model illustrated in FIG. 2, according to the present invention.

FIG. 3 shows an inverse model using the forward model illustrated in FIG. 2. The dead time 5 is removed from the fuel system 3 to maintain solely the first-order lag 6. In accordance with the removed dead time, a phase-advance unit 9 is provided in the air system 4 in order to make its phase coincide with that of the fuel system 3. By removing the dead time, the gain of feedback can be increased. An inverse model 30 is constituted by connecting the forward model 2 to a feedback processing unit 8. A transfer function of the inverse model 30 is 1/F(s) wherein F(s) is a transfer function of the forward model 2, as described above. Thus, by inputting to a subject, an output (causative signal) from the inverse model 30, which output is obtained by inputting a target value of an indicative signal to the inverse model 30, the subject outputs the same output (indicative signal) as the target value, since a transfer function of the entire system is 1.

Figure 4:
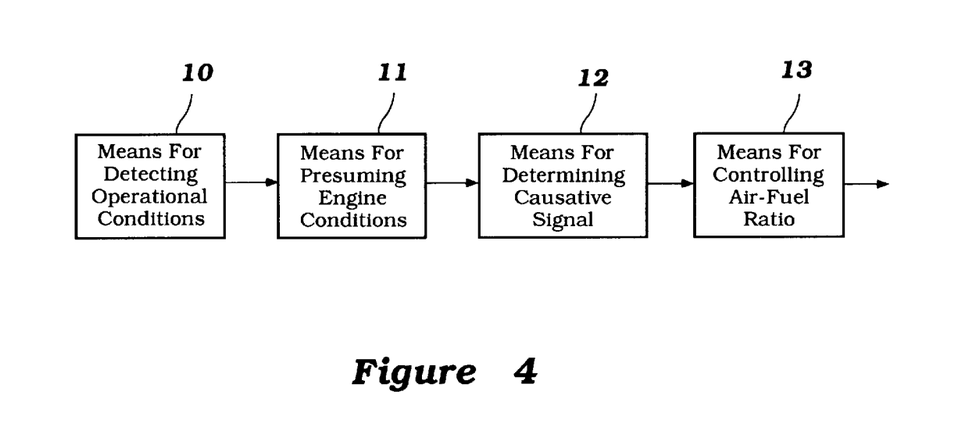
FIG. 4 shows a block diagram of an air-fuel ratio control system based on model based control using an inverse model, according to the present invention.

FIG. 4 shows a block diagram of an air-fuel ratio control system based on model-based control using an inverse model. Means for detecting a driving state (operational conditions) 10 comprises a sensor for detecting various factors necessary to calculate a throttle angle, engine speed, intake temperature, engine temperature, air-fuel ratio, and other changes. A detection output from the means for detecting driving conditions 10 is inputted to means for presuming engine conditions 11.

The means for presuming engine conditions 11 presumes an actuating value for an engine in accordance with the driving conditions, based on the inverse model. For example, when a target value is set, a fluctuation of the engine (forward model) with respect to the target value is calculated based on data such as those related to throttle angles, and a value necessary to coincide with the target value is calculated. Accordingly, if the engine, which is a subject to be controlled, has exactly the same function as that of a forward model, the engine conditions can remain at the target value, based on the calculated results using the inverse model.

However, in reality, a fluctuation with respect to the target value occurs due to higher-order lags or changes in characteristics with age according to duration and circumstances of the engine. To compensate for the fluctuation, means for determining a causative signal 12 determines a modified value of the causative signal necessary to maintain the target value in accordance with the actual engine conditions. Based on the compensation (the modified value of the causative signal), means for controlling an engine (in this embodiment, means for controlling air-fuel ratios (A/F)) 13 controls drive means such as an injector necessary to control the air-fuel ratio.

Inverse Model Control

The present invention will be explained further with reference to the figures in a more concrete manner.

Figure 5:
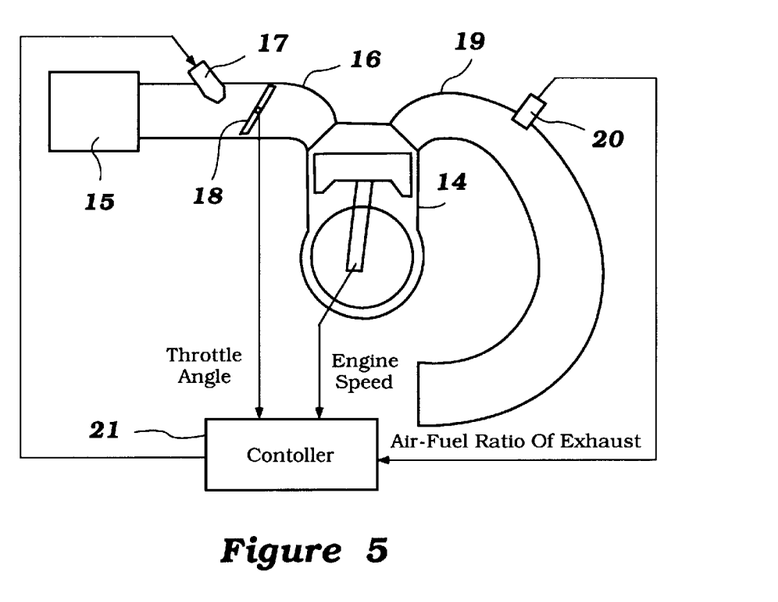
FIG. 5 shows an embodiment wherein the present invention is adopted for an air-fuel ratio control system of an engine of an electrically-controlled fuel-injection type (EFI).

FIG. 5 shows an embodiment wherein the present invention is adapted for an air-fuel ratio control system of an engine of an electrically-controlled fuel-injection type (EFI). An intake pipe 16 is connected to an engine 14 through an air cleaner 15. The intake pipe 16 is provided with an electrically controlled injector 17 which is installed upstream of a throttle valve 18. An exhaust pipe 19 is also connected to the engine 14, and an oxygen sensor 20 is disposed on the exhaust pipe 19. A crank shaft and throttle valve 18 of the engine 14 are provided with an engine speed sensor and a throttle angle sensor (not indicated), respectively. As with the oxygen sensor, both sensors are connected to a controller 21. The controller 21 performs processing necessary for air-fuel ratio control, based on input data from each sensor, thereby controlling the operation time of the injector 17.

Figure 6:
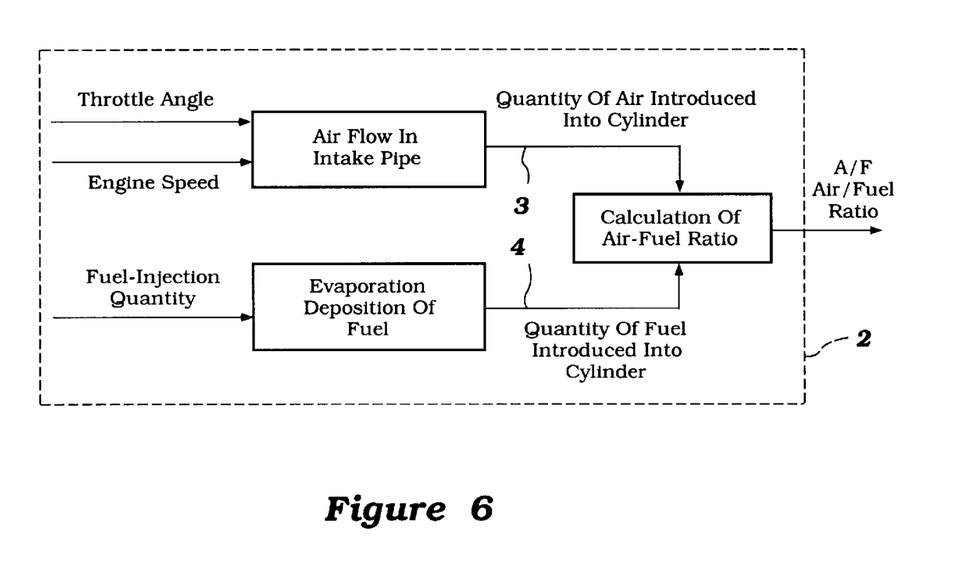
FIG. 6 shows a forward model installed in a processing circuit of a controller, according to the present invention.

FIG. 16 shows a forward model installed in a processing circuit of the controller 21. In an air system 3, based on data related to throttle angles and engine speeds, air flow in the intake pipe is analyzed, thereby processing a presumed quantity of air introduced into a cylinder. In the meantime, in a fuel system 4, a quantity of fuel evaporated or deposited on an intake pipe wall are determined based on a fuel-injection quantity, which is calculated from the operation value of the injector at the moment, thereby processing a presumed quantity of fuel introduced into the cylinder. A presumed air-fuel ratio is calculated from the presumed quantity of air and that of fuel introduced into the cylinder wherein the quantities have been presumed by model-processing of the air system 3 and fuel system 4.

Figure 7:
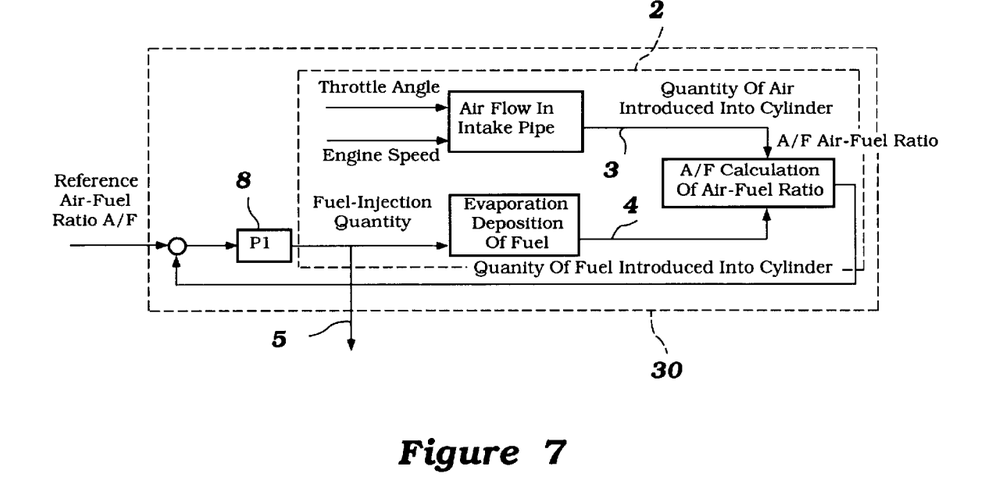
FIG. 7 shows an inverse model using the forward model 2 of FIG. 6, according to the present invention.

FIG. 7 shows an inverse model 30 using the forward model 2 of FIG. 6. The inverse model 30 is structured by constituting feedback of the forward model 2. Numeral 8 is a proportional and integral processing feedback unit. Using the inverse model 30, a causative signal value 5 based on the model is obtained by calculating a fuel-injection quantity based on the model when a target air-fuel ratio is inputted. In the above, as described earlier, in presumption processing of the forward model 2, it is considered that the air system 3 and the fuel system 4 have solely a first-order lag, except for dead time, whereby the phases of these systems are matched. In the feedback processing unit 8, mainly, proportional processing takes place in order to reduce integral components that cause a lag and to increase the gain.

Figure 8:
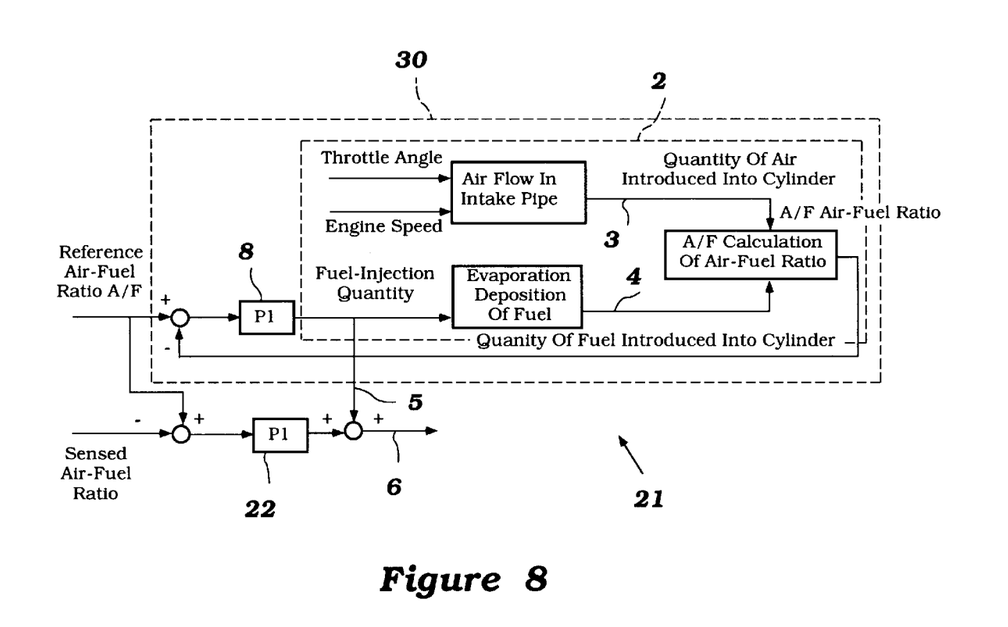
FIG. 8 shows a controller comprising a feedback control unit for compensating for a deviation from the inverse model of FIG. 7, using the air-fuel ratio detected by an oxygen sensor, according to the present invention.
Figure 9:
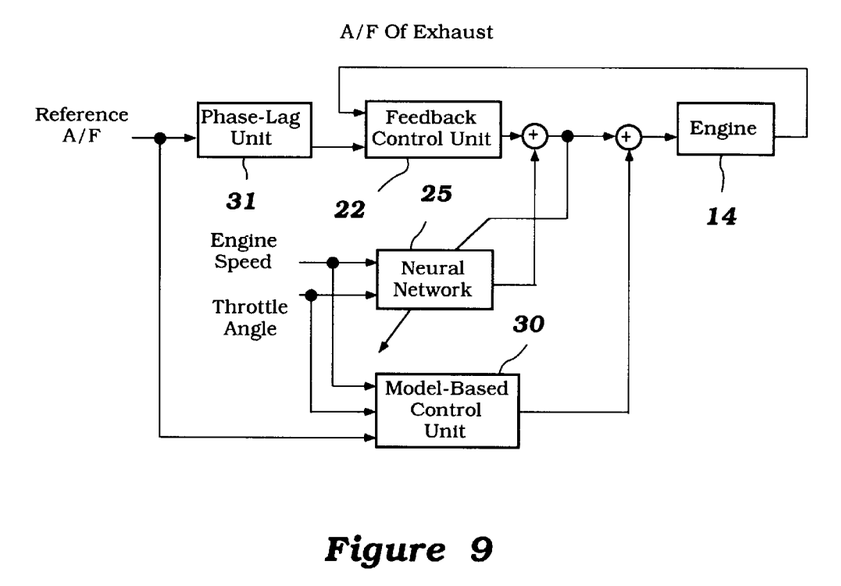
FIG. 9 shows a block diagram of air-fuel control of an engine using the model-based control according to the present invention.

FIG. 8 shows a controller 21 comprising a feedback control unit 22 for compensating for a deviation from the model generated by higher-order lags of the actual engine, for example, wherein performed is feedback of the air-fuel ratio, which results from operation of the actual engine using the causative signal 5 outputted from the inverse model 30, and which is detected by an oxygen concentration sensor. This feedback control unit 22 is different from the feedback processing unit 8 for forming the inverse model. The control of the feedback control unit is to compensate for normal deviation of the actual engine, and the feedback control unit mainly performs integral processing wherein the gain is set low. According to this embodiment, controllability during a transient state can be improved by using the inverse model, and controllability during a stable state can be improved by compensating for a deviation generated by the inverse model, further using feedback control Phase-Lag Control FIG. 9 shows a block diagram of air-fuel control of an engine using the model-based control according to the present invention. A model-based control unit is a processing unit using the inverse model 30 described above, wherein an air-fuel ratio of an engine model is presumed by inputting detected data related to a target air-fuel ratio, engine speed, and throttle angle. The resulting presumed air-fuel ratio is inputted to the actual engine 14, and then feedback of output of the engine (the air-fuel ratio of an exhaust) is performed at the feedback control unit 22, thereby compensating for a deviation between the indicative signal of the actual engine and the indicative signal based on the model, as described above.

In this embodiment, the target air-fuel ratio is inputted to the feedback control unit 31 via a phase-lag unit 31. The phase-lag is explained below.

When the air-fuel ratio is controlled by feedback, a control signal of the operation time of the injector calculated in accordance with the target air-fuel ratio is first inputted, the injector is then activated, i.e., until fuel starts burning in a combustion chamber, dead time occurs, such as a motion time of a solenoid valve of the injector and a time required for actual combustion after fuel is injected. That is, even when a causative signal in accordance with the target value is inputted, no response to this input occurs until dead time elapses. Thus, feedback data detected at the time the controlled variable is calculated in accordance with the target value, are as old as the dead time. Accordingly, feedback control at a certain moment is conducted based on the target value inputted before the dead time elapses. In the above, if the target value is constant with time, the above feedback control works without problems. However, when the target value is changed with time, appropriate control suffers. When the target value is changed, during the dead time, control is conducted based on the previous target value (before change), an integral error in compensation is accumulated. After the dead time elapses, extremely high causative signal is obtained, thereby causing the air-fuel ratio to widely fluctuate. In order to prevent the above problem, a phase-lag corresponding to the dead time is set to the target value of feedback control, whereby feedback control is always conducted a period of dead time later. Accordingly, the time that the target value is changed and the time that feedback data are changed coincide, and thus, an appropriate compensation in accordance with the target value is realized using the feedback control.

In this embodiment, by using the feedback control via the phase-lag unit 31, model-based control is compensated for in accordance with the state of the actual engine. Further, as described later, learning control using a neural network 25 is combined to improve controllability with regard to a deviation from the target value.

Forward Model Control

Figure 10:
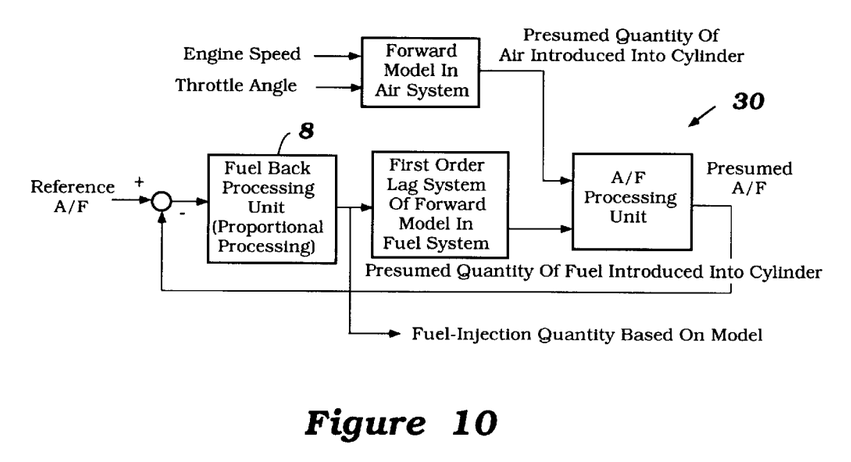
FIG. 10 shows a block diagram illustrating a structure of the model-based control unit (inverse model), according to the present invention.

FIG. 10 shows a block diagram illustrating the structure of the model-based control unit (inverse model 30). As described earlier, the engine has the air system and the fuel system, and the forward mode of the air system can be expressed by equations based on aeromechanics, whereas the forward model of the fuel system can be expressed by a combination of first-order lags. Using the forward models of the air system and the fuel system, presumed quantities of air and fuel introduced into the cylinder are calculated, and thereby a presumed air-fuel ratio is calculated based on the presumed quantities of air and fuel. The inverse model 30 is constituted by the air-fuel ratio processing unit for the forward models, as well as a feedback processing unit 8 for performing feedback of data based on the model. The inverse model 30 calculates a fuel-injection quantity based on the model, and outputs the result. In the feedback processing unit 8 for forming the inverse model, in order to increase the gain, integral components which cause a lag are reduced, and proportional processing is mainly conducted.

Forward Model Control in Air System

Figure 11:
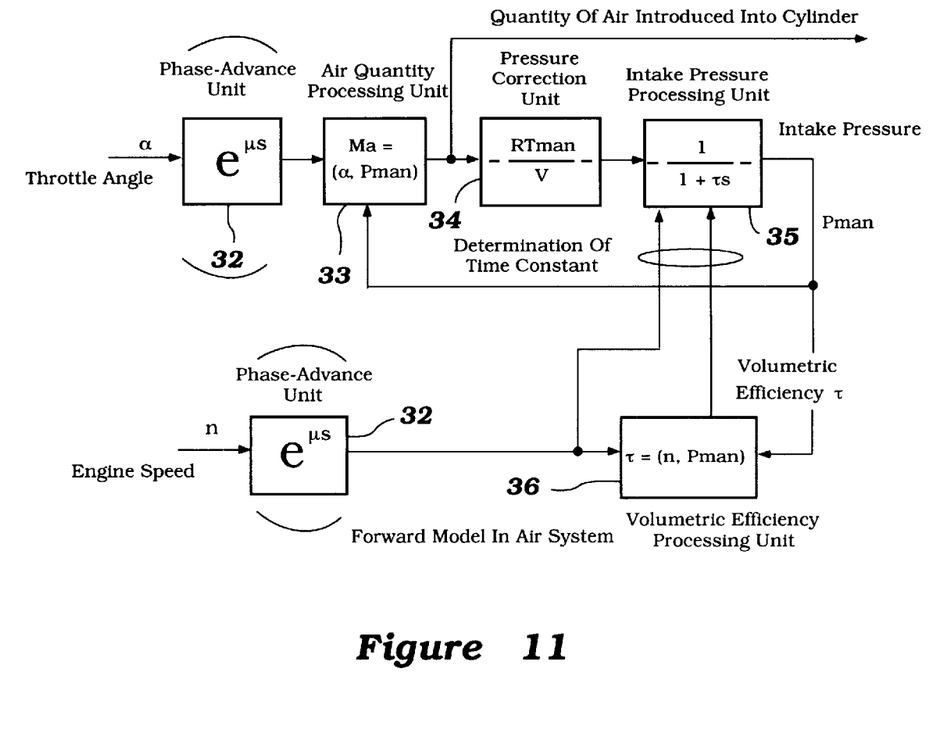
FIG. 11 shows a block diagram illustrating a structure of the forward model of the air system indicated in FIG. 10, according to the present invention.

FIG. 11 shows a block diagram illustrating the structure of the forward model of the air system indicated in FIG. 10. As described above, in the forward model of the air system, the phase is advanced to a degree equivalent to the dead time in the fuel system in order to coincide with the phase in the fuel system. Throttle angle signal α and engine speed signal n are inputted into a processing circuit in the model through a phase-advance unit 32. Based on negative pressure $P_{man}$ in the intake pipe at the inputted throttle angle α, a quantity of air introduced into the cylinder is calculated at an air quantity processing unit 33. Based on volume V of the interior of the intake pipe, time constant τ, volumetric efficiency η, and others at the calculated air quantity, intake-negative pressure $P_{man}$ is calculated at a pressure conversion unit 34 and an intake pressure processing unit 35. Volumetric efficiency η is calculated at a volumetric efficiency processing unit 36 based on data related to engine speed inputted through the phase-advance unit 32, and on intake-negative pressure $P_{man}$ calculated at the intake pressure processing unit 35. The obtained volumetric efficiency η is sent to the intake pressure processing unit 35. By using the circuit described above, the quantity of air introduced into the cylinder is calculated in the air system.

In a fuel system in an EFI embodiment, a model can be formed by disregarding dead time, i.e., dead time is zero. In the above, in an air system, the phase-advance unit 32 need not be provided, and data related to throttle angle and engine speed are inputted directly into the air quantity processing unit 33 and the volumetric efficiency processing unit 36. The phase-advance unit 32 in FIG. 11 is required when dead time is set in a model of the fuel system.

Figure 12:
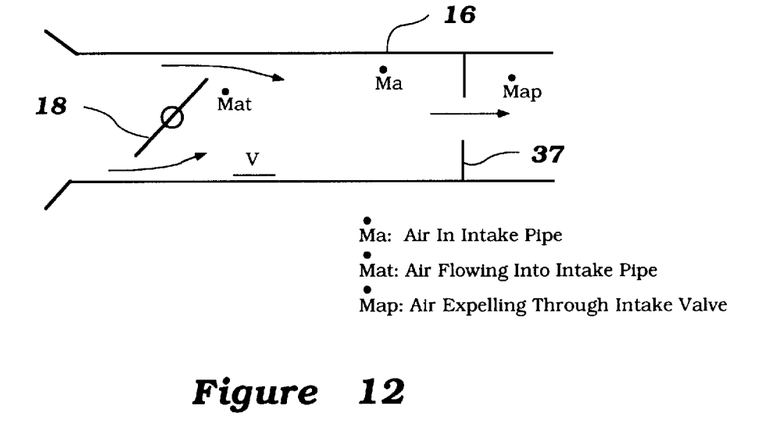
FIG. 12 shows air flow in an intake pipe.

Quantity of air and pressure in the intake pipe in the air system will be explained with reference to FIG. 12. FIG. 12 shows air flow in an intake pipe 16. Numeral 18 is a throttle valve, and numeral 37 is an intake valve. The pressure in the intake pipe 16 is derived based on conservation of mass between the throttle valve 18 and the intake valve 37, as indicated in equation (1).

$$m_a40 = m_{at}' - m_{ap}' \quad (1)$$

In the above, the quantity of air expelled through the intake valve, $m_{ap}'$, is expressed by equation (2) indicated below.

$$m_{ap} = (n/120)V_d\rho\eta_{vol}$$

wherein $V_d$ is a cylinder volume. According to the equation of state of ideal gas, $$P_{man}V = nRT_{man} \rightarrow \rho = n/V = P_{man}/RT_{man}$$

wherein V is the capacity between the throttle plate and the intake valve. Thus, $$m_{ap} = (n/120)V_d(P_{man}/RT_{man})\eta_{vol} \quad (2)$$

The quantity of air in the intake pipe, $m_a'$, can be expressed by equation (3).

$$P_{man}V = nRT_{man} \rightarrow n = P_{man}V/RT_{man}$$

Thus, $$m_a' = P_{man}'V/RT_{man} \quad (3)$$

When equations (2) and (3) are inputted into equation (1), negative pressure $P_{man}'$ in the intake pipe can be calculated as shown in equation (4) or (5).

$$P_{man}'V/RT_{man}=(n/120)(V_d\eta_{vol}/RT_{man})P_{man}+m_{at}'(\alpha,P_{man})$$

$$\rightarrow P_{man}'=(n/120)(V_d/V)\eta_{vol}P_{man}+(RT_{man}/V)m_{at}'(\alpha, P_{man}) \quad (4)$$

or $$P_{man}'=-(1/\tau_{man})P_{man}+(RT_{man}/V)m_{at}'(\alpha, P_{man})=f_3(\alpha, n, P_{man}) \quad (5)$$

wherein $$\eta_{man}=120V/V_d\eta_{vol} \quad (6)$$

Volumetric efficiency $\eta_{vol}$ can be expressed by equation (7).

$$\eta_{vol}(n, P_{man})=\eta_{un0}+\eta_{un1}n+\eta_{un2}n^2+\eta_{up1}P_{man} \quad (7)$$

The quantity of air passing through the throttle valve is approximated to a flow passing through a nozzle having a cross-sectional area $A_t=(\pi/4)D^2$. Therefore, intake air quantity $m_{at}'$ can be expressed by equation (8).

$$m_{at}'(\alpha, P_{man})=c_t(\pi/4)D^2(P_{amb}\sqrt{\kappa})/(\sqrt{(RT_{amb})})\beta_1(\alpha)\beta_2(P_{man})+m_{at0}(8)$$

wherein $c_t$ is a flow coefficient of the throttle, D is a diameter of the throttle, $T_{amb}$ is atmospheric temperature, $\kappa=2\kappa/(\kappa-1)$, $m_{at0}'$ is a constant, $P_{amb}$ is atmospheric pressure, and R is a gas constant.

$$\beta_1(\alpha)=0 \quad (0\leq\alpha\leq\alpha_0)$$

$$\beta_1(\alpha)=(1-\cos(\alpha)-b_0 \quad (\alpha_0\leq\alpha\leq\alpha_2)$$

$$\beta_1(\alpha)=A_N \quad (\alpha_2\leq\alpha\leq 90°) \quad (9)$$

wherein $\alpha_0$ is a throttle angle when completely closed ($\approx 2°$), $b_0=\alpha_0^2/2!$, $\alpha_2=\cos^{-1}(a\cos(\alpha_0))$, and $A_N=1-(4a/\pi)$.

$$\beta_2(P_{man})=\sqrt{(P_r^{2/\kappa}-P_r^{(\kappa+1)/\kappa}}(P_r\geq(2/(\kappa+1))^{\kappa/(\kappa+1)})$$

$$\beta_2(P_{man})=\sqrt{(1/\kappa)(1/(\kappa+1)^{(\kappa+1)/(\kappa-1)}} \quad (P_r \text{ is other than the above} \quad (10)$$

wherein $P_r=P_{man}/P_{amb}$.

Forward Model Control in Fuel System

Figure 13:
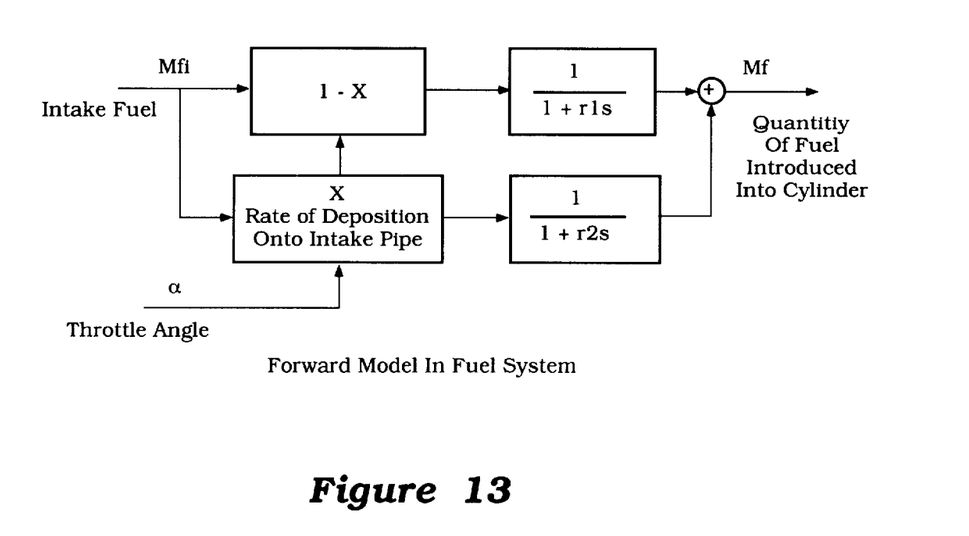
FIG. 13 shows a block diagram of the forward model of the fuel system illustrated in FIG. 10, according to the present invention.

FIG. 13 shows a block diagram of the forward model of the fuel system illustrated in FIG. 10. In this embodiment, quantity of fuel introduced into the cylinder, Mf, can be calculated from quantity of fuel injected from the injector, Mfi. Except for dead time, solely first-order lags are involved. Depending on the throttle angle, the rate of deposition of fuel onto a wall of the intake pipe, X, is determined. Accordingly, the quantity of fuel passing through the intake pipe, (1-X), can be determined, and a first-order lag is added thereto, and further, the quantity of fuel detached from a wall of the intake pipe and introduced into the cylinder is added thereto, thereby calculating quantity of fuel introduced into the cylinder, Mf. In the above, the first-order lag in the fuel ratio (1-X), i.e., the rate of fuel passing through the intake pipe to fuel depositing on a wall of the intake pipe, is usually set at zero. In this embodiment, however, when the lag is set at zero, processing cycles are considered to be dead time, i.e., the gain cannot be increased. Thus, a given first-order lag is added.

Neural Network Used in Phase Modulation

Figure 14:
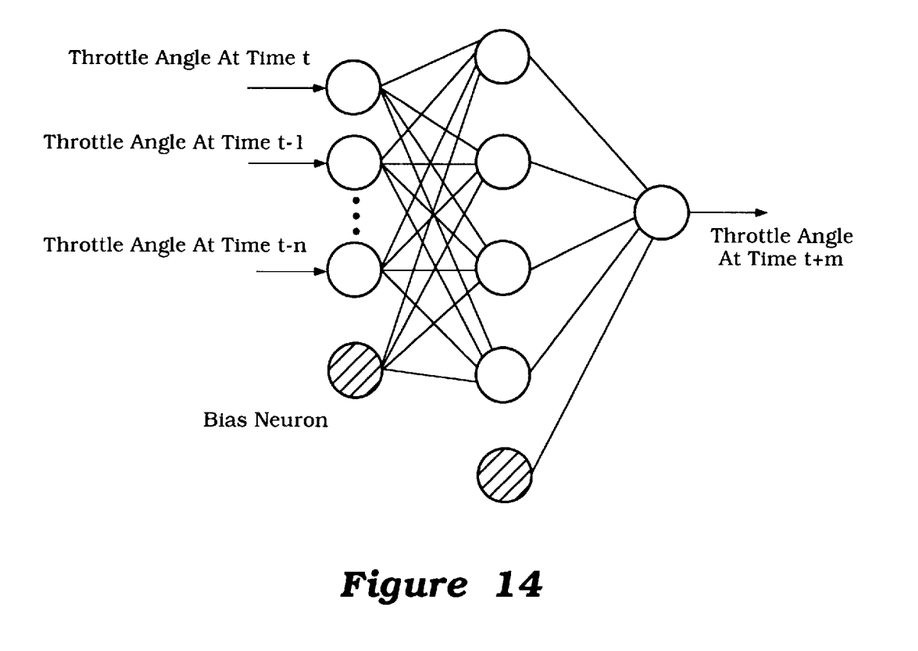
FIG. 14 shows a structure of a neural network used in the phase-advance unit for a throttle angle signal.

FIG. 14 shows a structure of a neural network used in the phase-advance unit 32 for a throttle angle signal. In this embodiment, the phase is advanced using a neural network. As shown in the figure, the neural network is constituted in such a way that, based on many past data, i.e., data related to throttle angles at time t, t−1, t−2 . . . , t−n, the throttle angle at time t−m in the future is presumed. Using neural network technology, the throttle angle when the phase is advanced by time m which is equivalent to dead time of the fuel system, can be calculated. Accordingly, as described above, it is possible to increase the gain of feedback to form an inverse model, to remove dead time, and to advance the phase in the air system in accordance with the removal of dead time, thereby causing the phases in the air and fuel systems to coincide.

In the above, in place of the use of a neural network advancing the phase in the air system, a method of least squares can be used to form a function based on the past data related to throttle angles, whereby the throttle angle when the phase is advanced by m based on the value of the function at time t+m.

Figure 15:
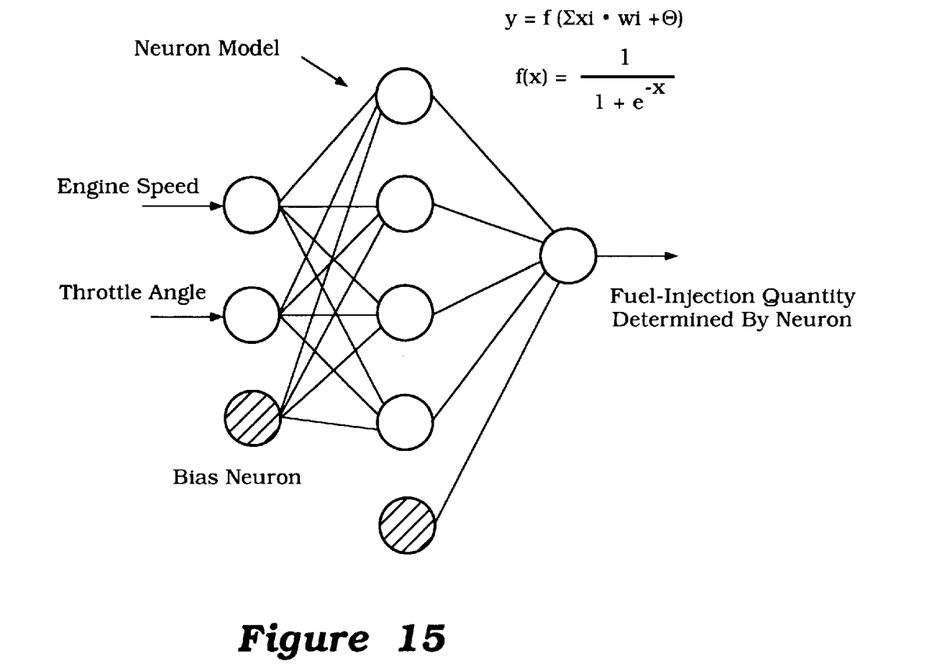
FIG. 15 shows a more concrete embodiment than the neural network indicated in FIG. 9.

FIG. 15 shows a more concrete embodiment than the neural network 25 indicated in FIG. 9. As described above, in order to compensate for a deviation between the actual engine and the model due to higher-order lags of model-based control and its changes with time, feedback control over the air-fuel ratio is conducted at the feedback control unit 22 (FIG. 9). However, this feedback control is to process data to calculate the air-fuel ratio after detecting oxygen concentration in actual exhaust gas, and thus, the feedback control aims at effectively compensating for a deviation in a stable state by reducing the gain. Therefore, it is difficult to realize compensation during a transient state because controllability is low. In order to improve controllability during a transient state, learning function of the neural network 25 can effectively be used in combination with the feedback control.

In the neural network, when a causative signal is calculated at the inverse model 30, data related to engine speed and throttle opening inputted into the model-based control unit (FIG. 9) are also inputted into the neural network 25. Data related to indicative signal (fuel-injection quantity), which have been compensated for by the feedback control with respect to the above inputted data, are used as teacher data. The neural network is constituted by storing and learning the data. By using the neural network, fuel-injection quantities for compensating for a deviation of the air-fuel ratio between the model and the actual engine can be obtained in a timely manner (on a real time basis) only by inputting engine speed and throttle angle into the neural network which uses the accumulated and learned data.

By employing a combination of learning control using the neural network and feedback control, compensation control can be conducted with high controllability, and not only during a stable state but also during a transient state, responsiveness of air-fuel ratio control can be high. In the above, if teacher data are insufficient at the beginning, feedback control is mainly conducted to compensate for indicative signal, and as the amount of teacher data is increased and stored, neural network control is gradually activated and takes over compensation control from the feedback control, and finally, all compensation control, including processing intermediate data of accumulated data related to engine speed and throttle angle, is preferably switched from the feedback control to the neural network control. Responsiveness of the neural network control is higher than that of the feedback control.

Other Embodiments

Figure 16:
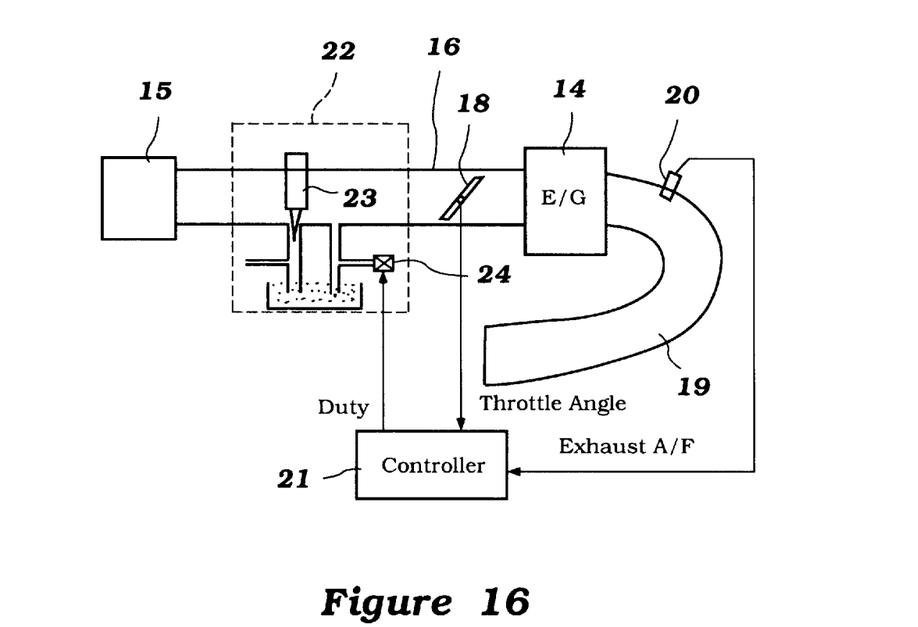
FIG. 16 shows a schematic view of a structure of an air-fuel control system using an electrically controlled carburetor, according to the present invention.

FIGS. 16 to 19 show another embodiment. This embodiment illustrates a control system for controlling the air-fuel ratio by an electrically controlled carburetor which controls an air bleed. FIG. 16 shows a schematic structure of this embodiment. As with a throttle valve 18, a carburetor 22 is connected to an intake pipe 16 of an engine 14. The carburetor 22 and the throttle valve 18 are upstream of the engine 14. The carburetor 22 is provided with a solenoid 24 for air bleed, as well as a needle valve 23 disposed at a port from which fuel is sucked out due to intake-negative pressure. A controller 21 controls the duty ratio of the solenoid 24 for air bleed to adjust quantity of air bleed, thereby controlling the air-fuel ratio. As with the previous embodiment, detection signals from a throttle angle sensor and oxygen concentration sensor 20 are inputted into the controller 21.

Figure 17:
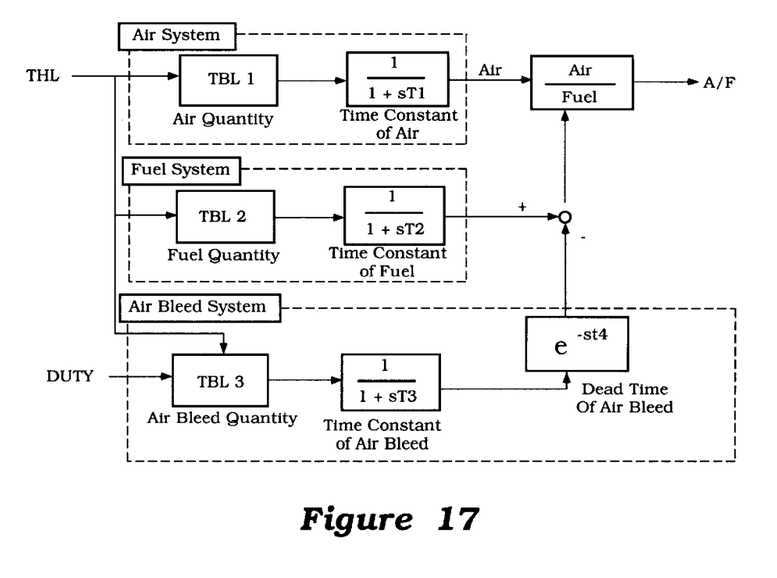
FIG. 17 shows a forward model of the engine in the system illustrated in FIG. 16.

FIG. 17 shows a forward model of the engine in this system. As shown in the figure, an engine control system is divide into an air system, a fuel system, and an air bleed system, each being approximated by a first-order lag, only the air bleed system involving dead time. Other structures can be employed. A throttle angle signal (THL) from the throttle angle sensor is inputted into each of the air system, the fuel system, and the air bleed system, whereas a duty ratio signal (DUTY) from the controller is inputted into the air bleed system.

Figure 18:
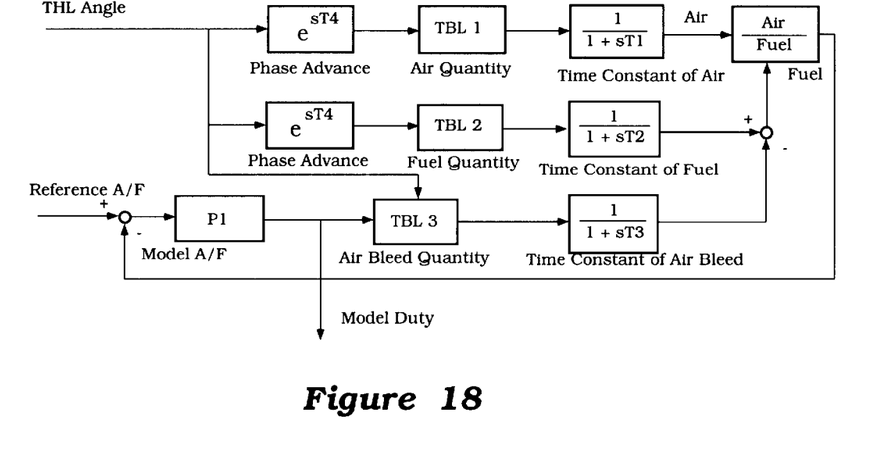
FIG. 18 shows an inverse model using the forward model of FIG. 17.

FIG. 18 shows an inverse model using the forward model of FIG. 17. As with the previous embodiment of EFI, dead time is removed from the air bleed system having dead time, and each phase of the air system and the fuel system is advanced in accordance with the removed dead time, thereby causing the three phases to coincide. The air bleed system from which dead time is removed undergoes feedback to constitute an inverse model, and as conducted in the previous embodiment, a causative signal (duty ratio) is outputted using the inverse model.

In the above, in the inverse model of the carburetor, unlike the previous EFI, dead time of air bleed is too significant to disregard it (see FIG. 17), and thus, a phase-advance unit must be provided in accordance with the dead time. In the EFI, the phase-advance unit 32 can be omitted in some cases (see FIG. 11).

Figure 19:
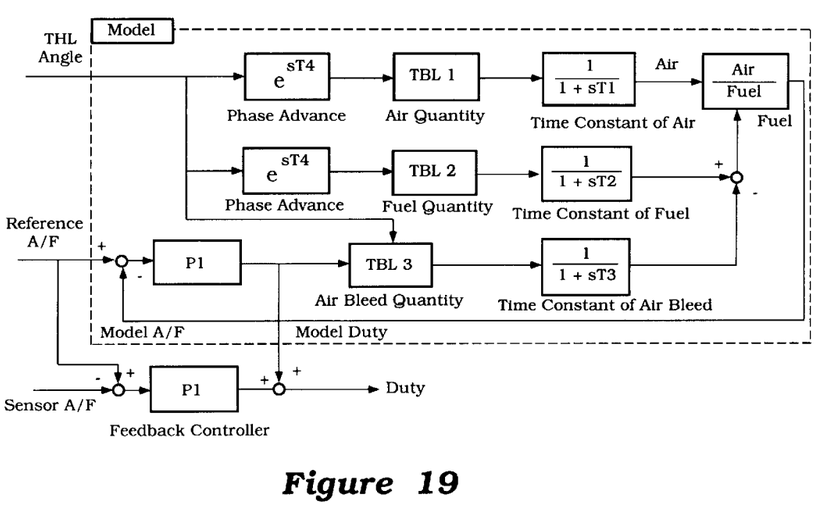
FIG. 19 shows a control system using a combination of the model-based control and feedback control which compensates for a deviation between the outcome of the model-based control and the actual conditions, according to the present invention.

FIG. 19 shows a control system using a combination of the model-based control and feedback control which compensates for a deviation between the outcome of the model-based control and the actual conditions. By additionally using feedback control for compensation in the controller, the same functions and effects as in the previous EFI embodiment can be exhibited. In addition, a configuration having a phase-advance unit for advancing the phase in accordance with dead time, a configuration having a phase-lag unit downstream of the feedback control unit for compensation, and a configuration having learning control using a neural network in addition to the feedback control for compensation, can be employed as in the previous EFI embodiment.

Figure 20A:
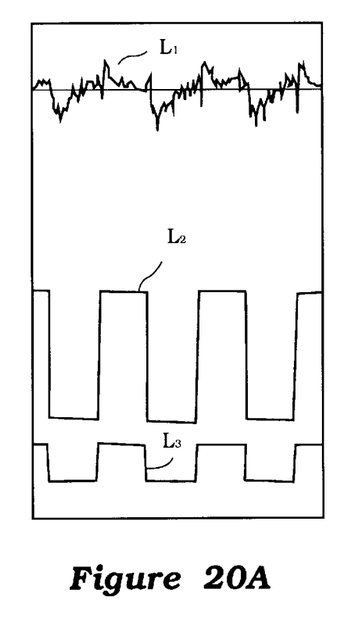
FIG. 20A is a graph based on the map control.
Figure 20B:
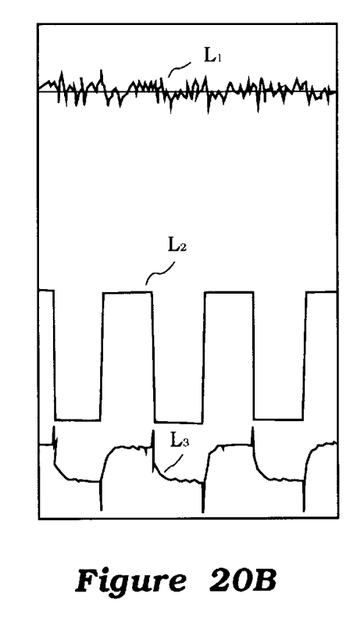
FIG. 20B is a graph based on the model-based control according to the present invention.

FIG. 20 shows graphs indicating fluctuations of controlled parameters. FIG. 20A is a graph based on the map control, and FIG. 20B is a graph based on the model-based control according to the present invention. In each figure, L1 shows fluctuations of the air-fuel ratio, L2 shows fluctuations of the throttle angle, and L3 shows fluctuations of the duty ratio of the solenoid for air bleed. As understood from the figures, based on the map control shown in FIG. 20A, the duty ratio is changed uniformly in a rectangular shape in accordance with opening and closing operation of the throttle valve, and when the opening of the throttle valve is changed (transient state), the air-fuel ratio widely fluctuates. In contrast, based on the model-based control, when the opening of the throttle valve is changed, immediately before the duty ratio goes up and immediately before the duty ratio goes down, the duty ratio is changed sharply in a different direction, thereby rendering the air-fuel ratio practically stable. That is, in the map control, the duty ratio is changed simply in accordance with changes in throttle angle, i.e., the change in the duty ratio simply follows up with the change in throttle angle. In contrast, in the modal-based control, a change in the opening of the throttle valve is presumed during a transient state, and the duty ratio is outputted in accordance with the presumed change, thereby preventing fluctuations of the air-fuel ratio during a transient state.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A system for controlling a machine operable by at least one causative signal, at a predetermined target value of an indicative signal without delay in responding to input of the predetermined target value of the indicative signal, said indicative signal indicating a result of operation of the machine by the causative signal, wherein the indicative signal is theoretically calculable from the causative signal whereas the causative signal is theoretically incalculable from the indicative signal due to high-order lag elements of calculation, said system comprising:

a computer simulation model of the machine which calculates and outputs a simulated value of the indicative signal when a value of the causative signal is inputted;

a feedback unit which compares the simulated value of the indicative signal and a predetermined target value of the indicative signal, and which modifies the value of the causative signal based on said comparison to match the simulated value of the indicative signal and the predetermined target value of the indicative signal;

a circuit for inputting the modified value of the causative signal from the feedback unit into the computer simulation model; and a circuit for inputting the modified value of the causative signal from the feedback unit into the machine to operate the machine.

2. The system according to claim 1, wherein the machine to be controlled is an engine, the indicative signal includes the air-fuel ratio, and the causative signal includes fuel-injection quantity, wherein the system further comprises a circuit for inputting an engine speed and a throttle angle into the computer simulation model to calculate the air-fuel ratio.

3. A system for controlling a machine operable by at least one causative signal, at a predetermined target value of an indicative signal without delay in responding to input of the predetermined target value of the indicative signal, said indicative signal indicating a result of operation of the machine by the causative signal, wherein the indicative signal is theoretically calculable from the causative signal whereas the causative signal is theoretically incalculable from the indicative signal due to high-order lag elements of calculation, said system comprising:

a computer simulation model of the machine which calculates and outputs a simulated value of the indicative signal when a value of the causative signal is inputted;

a feedback unit which compares the simulated value of the indicative signal and a predetermined target value of the indicative signal, and which modifies the value of the causative signal based on said comparison to match the simulated value of the indicative signal and the predetermined target value of the indicative signal;

a circuit for inputting the modified value of the causative signal from the feedback unit into the computer simulation model;

a circuit for obtaining an actual value of the indicative signal from the machine;

a second feedback unit which compares the actual value of the indicative signal and the predetermined value of the indicative signal, and which compensates for the modified value of the causative signal based on said comparison to match the actual value of the indicative signal and the predetermined target value of the indicative signal; and a circuit for inputting the compensated modified value of the causative signal from the second feedback unit into the machine to operate the machine.

4. The system according to claim 3, further comprising:

a circuit for comparing the modified value of the causative signal and the compensated modified value of the causative signal; and a circuit for inputting said comparison and the predetermined target value of the indicative signal into the computer simulation model to update the model, wherein the computer simulation model has a learning function.

5. The system according to claim 4, wherein said learning function comprises a neural network, in which said comparison and the modified value of the causative signal are used as teacher data.

6. The system according to claim 3, wherein the machine to be controlled is an engine, the indicative signal includes the air-fuel ratio, and the causative signal includes fuel-injection quantity, wherein the system further comprises a circuit for inputting an engine speed and a throttle angle into the computer simulation model to calculate the air-fuel ratio.

7. A method for controlling a machine operable by at least one causative signal, at a predetermined target value of an indicative signal without delay in responding to input of the predetermined target value of the indicative signal, said indicative signal indicating a result of operation of the machine by the causative signal, wherein the indicative signal is theoretically calculable from the causative signal whereas the causative signal is theoretically incalculable from the indicative signal due to high-order lag elements of calculation, said machine provided with a control unit comprising a computer simulation model of the machine which calculates and outputs a simulated value of the indicative signal when a value of the causative signal is inputted, said method comprising the steps of:

(a) at a predetermined target value of the indicative signal, inputting a value of the causative signal into the computer simulation model, and outputting a simulated value of the indicative signal;

(b) comparing the simulated value of the indicative signal and the predetermined target value of the indicative signal;

(c) modifying the value of the causative signal based on the comparison in step (b) to match the simulated value of the indicative signal and the predetermined target value of the indicative signal;

(d) inputting the modified value of the causative signal into the computer simulation model, and outputting a simulated value of the indicative signal;

(e) inputting the modified value of the causative signal into the machine to operate the machine; and (f) repeat steps (b) through (e); whereby the machine is controlled substantially at the predetermined target value of the indicative signal without delay in responding to the input of the predetermined target value of the indicative signal.

8. The method according to claim 7, wherein the machine to be controlled is an engine, the indicative signal includes the air-fuel ratio, the causative signal includes fuel-injection quantity, and when calculating the air-fuel ratio from the fuel-injection quantity, an engine speed and a throttle angle are inputted into the computer simulation model.

9. A method for controlling a machine operable by at least one causative signal, at a predetermined target value of an indicative signal without delay in responding to input of the predetermined target value of the indicative signal, said indicative signal indicating a result of operation of the machine by the causative signal, wherein the indicative signal is theoretically calculable from the causative signal whereas the causative signal is theoretically incalculable from the indicative signal due to high-order lag elements of calculation, said machine provided with a control unit comprising a computer simulation model of the machine which calculates and outputs a simulated value of the indicative signal when a value of the causative signal is inputted, said method comprising the steps of:

(a) at a predetermined target value of the indicative signal, inputting a value of the causative signal into the computer simulation model, and outputting a simulated value of the indicative signal;

(b) comparing the simulated value of the indicative signal and the predetermined target value of the indicative signal;

(c) modifying the value of the causative signal based on the comparison in step (b) to match the simulated value of the indicative signal and the predetermined target value of the indicative signal;

(d) inputting the modified value of the causative signal into the computer simulation model, and outputting a simulated value of the indicative signal;

(e) inputting the modified value of the causative signal into the machine to operate the machine;

(f) obtaining an actual value of the indicative signal from the machine;

(g) comparing the actual value of the indicative signal and the predetermined value of the indicative signal;

(h) compensating for the modified value of the causative signal based on the comparison in step (g) to match the actual value of the indicative signal and the predetermined target value of the indicative signal;

(i) inputting the compensated modified value of the causative signal into the machine to operate the machine; and (j) repeating steps (b) through (d) and steps (f) through (i); whereby the machine is controlled substantially at the predetermined target value of the indicative signal without delay in responding to the input of the predetermined target value of the indicative signal.

10. The method according to claim 9, further comprising the step of updating the computer simulation model by a method comprising:

after step (i), comparing the modified value of the causative signal and the compensated modified value of the causative signal; and updating the computer simulation model based on said comparison and the predetermined target value of the indicative signal.

11. The method according to claim 10, wherein said computer simulation model has a leaning function comprising a neural network, in which the sum of the modified value of the causative signal and the compensated modified value of the causative signal are used as teacher data.

12. The method according to claim 9, wherein the machine to be controlled is an engine, the indicative signal includes the air-fuel ratio, the causative signal includes fuel-injection quantity, and when calculating the air-fuel ratio from the fuel-injection quantity, an engine speed and a throttle angle are inputted into the computer simulation model.

* * * * *